(12) United States Patent
Tang et al.

(10) Patent No.: US 9,904,774 B2
(45) Date of Patent: Feb. 27, 2018

(54) METHOD AND DEVICE FOR LOCKING FILE

(71) Applicant: Xiaomi Inc., Beijing (CN)

(72) Inventors: Mingyong Tang, Beijing (CN); Yijun Liuhua, Beijing (CN); Zhinong Zhou, Beijing (CN)

(73) Assignee: Xiaomi Inc., Beijing (CN)

( * ) Notice: Subject to any disclaimer, the term of this patent is extended or adjusted under 35 U.S.C. 154(b) by 294 days.

(21) Appl. No.: 14/667,074

(22) Filed: Mar. 24, 2015

(65) Prior Publication Data

US 2015/0379252 A1  Dec. 31, 2015

Related U.S. Application Data

(63) Continuation of application No. PCT/CN2014/091545, filed on Nov. 19, 2014.

(30) Foreign Application Priority Data

Jun. 26, 2014  (CN) .......................... 2014 1 0299232

(51) Int. Cl.
*G06F 21/00* (2013.01)
*G06F 21/32* (2013.01)
*G06K 9/00* (2006.01)
*G06F 21/62* (2013.01)

(52) U.S. Cl.
CPC .......... *G06F 21/32* (2013.01); *G06F 21/6209* (2013.01); *G06K 9/00087* (2013.01); *G06K 9/00892* (2013.01)

(58) Field of Classification Search
None
See application file for complete search history.

(56) References Cited

U.S. PATENT DOCUMENTS

| | | | |
|---|---|---|---|
| 6,433,818 B1 * | 8/2002 | Steinberg | G07C 9/00142 348/161 |
| 8,423,476 B2 * | 4/2013 | Bishop | G06Q 20/027 705/66 |
| 2001/0035814 A1 | 11/2001 | Uchida | |
| 2003/0140235 A1 * | 7/2003 | Immega | G06F 21/32 713/186 |

(Continued)

FOREIGN PATENT DOCUMENTS

| CN | 101287247 A | 10/2008 |
|---|---|---|
| CN | 201726479 U | 1/2011 |

(Continued)

OTHER PUBLICATIONS

International Search Report of PCT International Application No. PCT/CN2014/091545, from the State Intellectual Property Office of China, dated Feb. 26, 2015 (5 pages).

(Continued)

*Primary Examiner* — Maung Lwin
(74) *Attorney, Agent, or Firm* — Finnegan, Henderson, Farabow, Garrett & Dunner LLP

(57) ABSTRACT

A method for locking a file includes: acquiring biological feature recognition information of a user, the biological feature recognition information including at least one of fingerprint information, voiceprint information, iris information, or face information; and locking a designated file using the biological feature recognition information.

15 Claims, 12 Drawing Sheets

Receive a locking instruction input by a current user to instruct to lock the saved first designated file — S301

Acquire fingerprint information of the current user — S302

Lock the first designated file using the acquired fingerprint information of the current user according to the locking instruction — S303

(56) References Cited

U.S. PATENT DOCUMENTS

| | | | | |
|---|---|---|---|---|
| 2005/0071635 | A1* | 3/2005 | Furuyama | G06F 21/32 |
| | | | | 713/168 |
| 2007/0289022 | A1* | 12/2007 | Wittkotter | H04L 63/123 |
| | | | | 726/27 |
| 2009/0083850 | A1* | 3/2009 | Fadell | G06F 21/316 |
| | | | | 726/19 |
| 2012/0090023 | A1* | 4/2012 | Chow | G06F 21/00 |
| | | | | 726/19 |
| 2013/0188062 | A1* | 7/2013 | Konicek | G03B 17/02 |
| | | | | 348/207.1 |
| 2014/0085460 | A1* | 3/2014 | Park | G06F 21/84 |
| | | | | 348/135 |
| 2014/0115725 | A1* | 4/2014 | Seo | G06F 3/0488 |
| | | | | 726/30 |
| 2014/0196156 | A1* | 7/2014 | Lection | G06F 21/6209 |
| | | | | 726/28 |
| 2014/0289534 | A1* | 9/2014 | Parry | H04L 63/0861 |
| | | | | 713/186 |

FOREIGN PATENT DOCUMENTS

| | | |
|---|---|---|
| CN | 103024158 A | 4/2013 |
| CN | 103051838 A | 4/2013 |
| CN | 103413072 A | 11/2013 |
| CN | 103699847 A | 4/2014 |
| CN | 103826046 A | 5/2014 |
| CN | 103886239 A | 6/2014 |
| CN | 104112091 A | 10/2014 |
| JP | 2000-083186 A | 3/2000 |
| JP | 2005-175627 A | 6/2005 |
| JP | 2005-236794 A | 9/2005 |
| JP | 2007-067783 A | 3/2007 |
| JP | 2008-523650 A | 7/2008 |
| JP | 2010-028404 A | 2/2010 |
| JP | 2010-226506 A | 7/2010 |
| JP | 2011-095980 A | 5/2011 |
| JP | 2014-067266 A | 4/2014 |
| KR | 2014-0043593 A | 4/2014 |
| KR | 2014-0051470 A | 5/2014 |
| RU | 2 318 241 C9 | 5/2008 |
| RU | 2 351 023 C2 | 3/2009 |
| RU | 2 361 272 C2 | 7/2009 |
| WO | WO 2013/155224 A1 | 10/2013 |
| WO | WO 2013/166886 A1 | 11/2013 |

OTHER PUBLICATIONS

European Search Report for Application No. 15 163 242.9-1853 dated Feb. 14, 2017.

"Samsung Patent Application Shows the Iris Scanner Capabilities in the Smartphone", http://galaxy-droid.ru/galaxy-s5/, dated Jan. 30, 2014.

English version of International Search Report for International Application No. PCT/CN2014/091545 dated Feb. 26, 2015.

* cited by examiner

| Collect face information or iris information of a current user when the first designated file is generated by photographing | S501 |

| Lock the first designated file using the face information or the iris information of the current user when the first designated file is saved | S502 |

METHOD AND DEVICE FOR LOCKING FILE

CROSS-REFERENCE TO RELATED APPLICATIONS

This application is a continuation of International Application NO. PCT/CN2014/091545, with an international filing date of Nov. 19, 2014, which is based upon and claims priority to Chinese Patent Application No. CN 201410299232.1, filed on Jun. 26, 2014, the entire contents of both of which are incorporated herein by reference.

TECHNICAL FIELD

The present disclosure relates to electronic devices and, more particularly, to a method and device for locking a file in an electronic device.

BACKGROUND

A user of a personal mobile terminal, such as a cellphone, can lock her mobile terminal to protect her privacy. In conventional technologies, manners for locking a mobile terminal include, for example, numeric password, gesture password, and fingerprint recognition. Among these locking techniques, fingerprint recognition is relatively reliable in terms of guaranteeing security and privacy of the user.

SUMMARY

According to a first aspect of the present disclosure, there is provided a method for locking a file, comprising: acquiring biological feature recognition information of a user, the biological feature recognition information including at least one of fingerprint information, voiceprint information, iris information, or face information; and locking a designated file using the biological feature recognition information.

According to a second aspect of the present disclosure, there is provided a device for locking a file, comprising: a processor; a non-transitory computer-readable storage medium storing instructions that, when executed by the processor, cause the processor to: acquire biological feature recognition information of a user, the biological feature recognition information including at least one of fingerprint information, voiceprint information, iris information, or face information; and lock a designated file using the biological feature recognition information.

According to a third aspect of the present disclosure, there is provided a non-transitory computer-readable storage medium storing instructions that, when executed by one or more processors of a device, cause the device to: acquire biological feature recognition information of a user, the biological feature recognition information including at least one of fingerprint information, voiceprint information, iris information, or face information; and lock a designated file using the biological feature recognition information.

It is to be understood that both the foregoing general description and the following detailed description are exemplary and explanatory only and are not restrictive of the present disclosure.

BRIEF DESCRIPTION OF THE DRAWINGS

FIG. 2c is a diagram illustrating an interface of a mobile terminal when a fingerprint recognition photographing function is on.

DETAILED DESCRIPTION

Embodiments consistent with the present disclosure include a method and device for locking a file in an electronic device.

Biological feature recognition identifies a personal identity by using intrinsic physiological characteristics of a human body. Biological feature recognition includes the use of, for example, computers, sensors such as optical, acoustic, or biological sensors, and the principle of biostatistics. Examples of biological feature recognition include fingerprint recognition, iris recognition, face recognition, palmprint recognition, voiceprint recognition, vein recognition, and brainwave recognition. Consistent with the present disclosure, the biological feature recognition technology is used to lock files, thereby protecting the privacy of a user. Methods consistent with the present disclosure can be implemented in a terminal, such as a mobile terminal.

Figure 1:
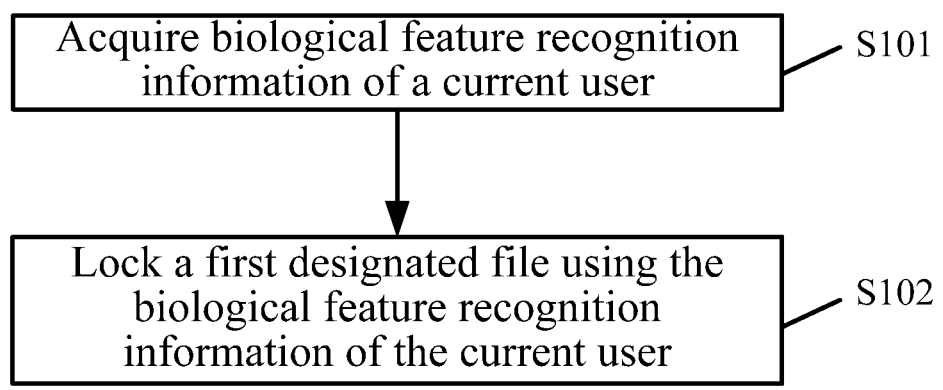
FIG. 1 is a flow chart showing a method for locking a file, according to an exemplary embodiment.

FIG. 1 is a flow chart showing an exemplary method for locking a file consistent with embodiments of the disclosure. As shown in FIG. 1, at S101, biological feature recognition information of a current user is acquired. The biological feature recognition information may include fingerprint information, voiceprint information, iris information, or face information. At S102, a first designated file is locked by using the biological feature recognition information of the current user. The first designated file may be, for example, a photo, a video, or a text file.

Consistent with the present disclosure, the current user (such as the owner of the mobile terminal) may wish to prevent other users from viewing certain files, such as photos or videos, stored on the mobile terminal Therefore, the current user locks the files that she does not want to share with other users, such as the first designated file described above, to protect her privacy. Since the biological feature recognition information is unique, the first designated file is effectively locked to protect the privacy of the current user.

Figure 2:
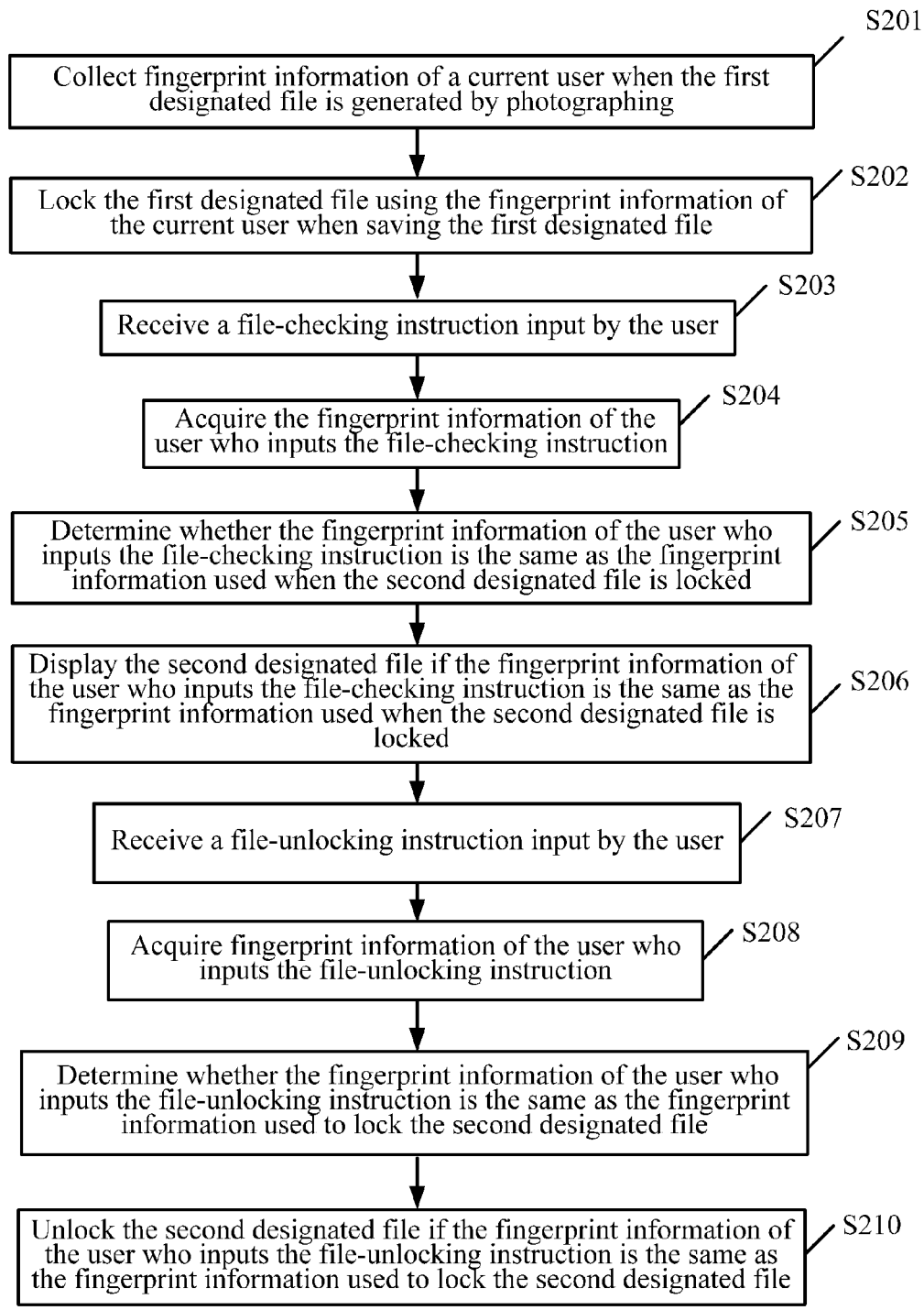
FIG. 2 is a flow chart showing a method for locking a file, according to another exemplary embodiment.

FIG. 2 is a flow chart showing another exemplary method for locking a file consistent with embodiments of the disclosure. In the method shown in FIG. 2, the biological feature recognition information includes fingerprint information, and the first designated file includes a photo file or a video file. In the present disclosure, a photo file or a video file is also referred to as an image file. As shown in FIG. 2, at S201, fingerprint information of a current user is collected when the first designated file is generated by photographing. In some embodiments, a first photographing instruction from the current user is received through a touchscreen and the fingerprint information is collected through the touchscreen when the current user inputs the first photographing instruction. The first photographing instruction instructs to perform photographing to generate the first designated file. The first designated file may be a photo or a video.

Figure 2A:
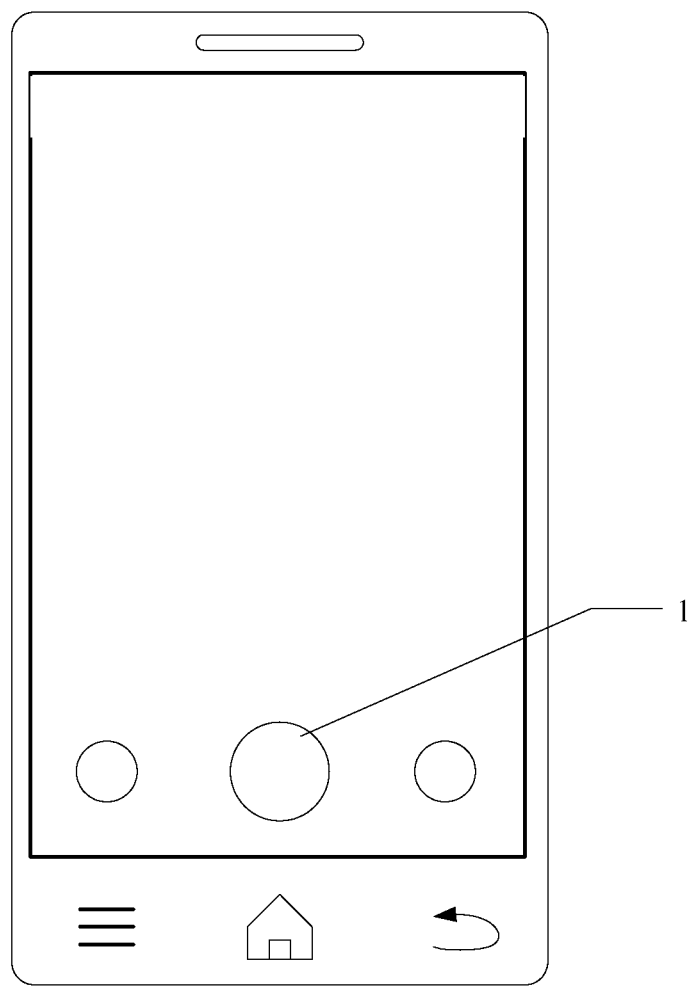
FIG. 2a is a diagram illustrating an interface when a mobile terminal outputs a first photographing shutter option.

For example, as shown in FIG. 2a, when a camera module within the mobile terminal is started, the mobile terminal outputs a first photographing shutter option 1. The scene to be shot or the photo or video that has been taken is shown in an image collecting area, which is schematically represented by the blank area on the mobile terminal as shown in FIG. 2a. The mobile terminal receives the first photographing instruction when the current user clicks on the first photographing shutter option 1, and takes a photo or a video. At the same time, the mobile terminal collects the fingerprint information of the current user when the current user clicks on the first photographing shutter option 1.

In the example shown in FIG. 2a, receiving the first photographing instruction and collecting the fingerprint information are performed at the same time, so as to simplify operation and save time. In some embodiments, the mobile terminal may also output a fingerprint collection option after receiving the first photographing instruction, and collect the fingerprint information of the user through the fingerprint collection option. Alternatively, the mobile terminal may output the fingerprint collection option when the camera module is started, and output the first photographing shutter option 1 for the user to input the first photographing instruction after the fingerprint of the user is collected by the fingerprint collection option.

After the fingerprint information of the current user is collected, the fingerprint information can be saved on the mobile terminal. The saved fingerprint information can later be used for comparison when the file is browsed, viewed, or unlocked (as described below in S203-S210).

Referring to FIG. 2, at S202, when the first designated file is saved, the first designated file is locked using the fingerprint information of the current user.

In some embodiments, when saving a photo that is taken or a video that is recorded, the mobile terminal locks the photo or the video, i.e., the first designated file using the fingerprint information of the current user. After the first designated file is locked, the first designated file is in a locked state, such as, for example, a hidden state, an unmodifiable state, an undeletable state, or an unviewable state. The manner to lock the first designated file may be a default setting in the mobile terminal, or may be set by the user.

At S203, a file-checking instruction input from the user is received. The file-checking instruction instructs to check a second designated file or a designated folder containing the second designated file. The second designated file is a file in the locked state, and may be a file obtained after S201-S202 are performed (i.e., the first designated file). For example, the file-checking instruction may be a folder-viewing instruction. The file-checking instruction may be received through the touchscreen.

At S204, the fingerprint information of the user who inputs the file-checking instruction is acquired. In some embodiments, the fingerprint information is acquired by the touchscreen at the same time when the user inputs the file-checking instruction. In some embodiments, when the user enters the file-checking instruction, the mobile terminal outputs a fingerprint collection option for collecting a fingerprint of the user.

At S205, it is determined whether the fingerprint information of the user who inputs the file-checking instruction is the same as the fingerprint information used when the second designated file is locked.

At S206, if the fingerprint information of the user who inputs the file-checking instruction is the same as the fingerprint information used when the second designated file is locked, the second designated file is displayed.

On the other hand, if the fingerprint information of the user who inputs the file-checking instruction is different from the fingerprint information used when the second designated file is locked, contents of the second designated file are not displayed.

Figure 2B:
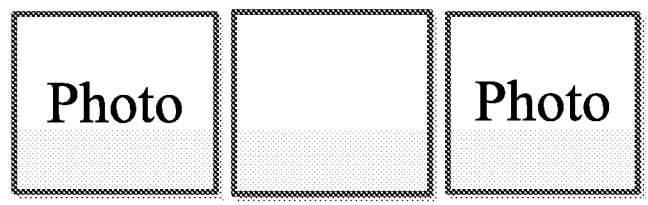
FIG. 2b is a diagram illustrating an interface containing a file in a locked state, which is output by a mobile terminal.

Consistent with the present disclosure, if the locked state of a file is the unviewable state, then in a file listing containing that file, the file is displayed as a blank or using a designated identifier. For example, as shown in FIG. 2b, three photos are listed while the middle one is in the unviewable state. As such, the middle photo is displayed as a blank, and other users cannot see contents of the middle photo. If the locked state of a file is the hidden state, the mobile terminal does not display any information of the file (including the above-mentioned blank and designated identifier), and will completely hide the file.

Figure 2C:
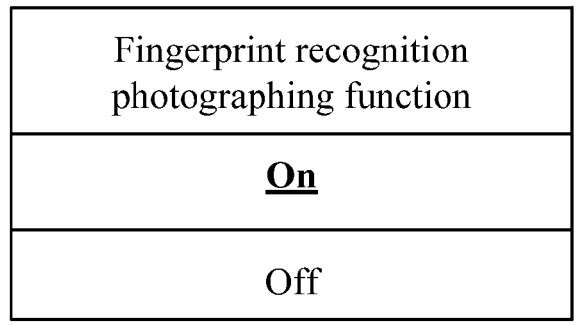
Figure 2D:
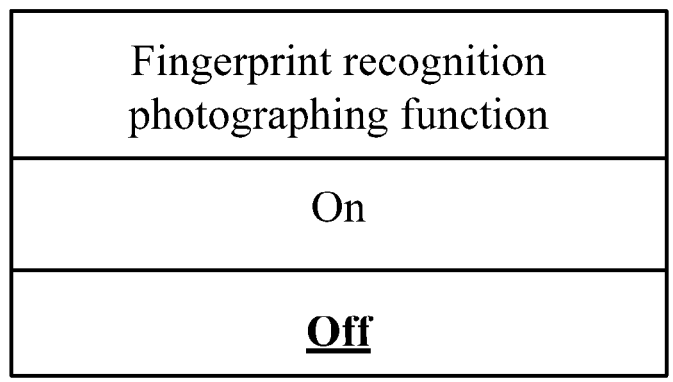
FIG. 2d is a diagram illustrating an interface of a mobile terminal when the fingerprint recognition photographing function is off.

In some embodiments, a function option switch is provided for the user to turn on or off the function of locking files using the biological feature recognition information. FIGS. 2c and 2d show an exemplary submenu of such a function option switch to turn on and off the fingerprint recognition photographing function. When the fingerprint recognition photographing function is turned on, as shown in FIG. 2c, the method consistent with the present disclosure is performed. On the other hand, when the fingerprint recognition photographing function is turned off, as shown in FIG. 2d, the photo or the video is taken in a general mode (that is, the fingerprint of the user is not collected, and the photo and video are directly saved to a preset position).

At S207, a file-unlocking instruction input by the user is received. The file-unlocking instruction instructs to unlock the second designated file or the designated folder containing the second designated file.

At S208, fingerprint information of the user who inputs the file-unlocking instruction is acquired.

At S209, it is determined whether the fingerprint information of the user who inputs the file-unlocking instruction is the same as the fingerprint information used to lock the second designated file.

At S210, if the fingerprint information of the user who inputs the file-unlocking instruction is the same as the fingerprint information used to lock the second designated file, the second designated file is unlocked.

If the fingerprint information of the user who inputs the file-unlocking instruction is different from the fingerprint information used to lock the second designated file, the unlocking operation is not performed, and prompt information may be output, for example, to indicate that the fingerprint information does not match.

After a locked file, such as a locked photo or video, is unlocked, the file transitions to an open state, such that other users can view the file without the need to validate fingerprint information.

Consistent with the present disclosure, S201-S202, S203-S206, and S207-S210 can be performed in an order other than that shown in FIG. 2.

Figure 3:
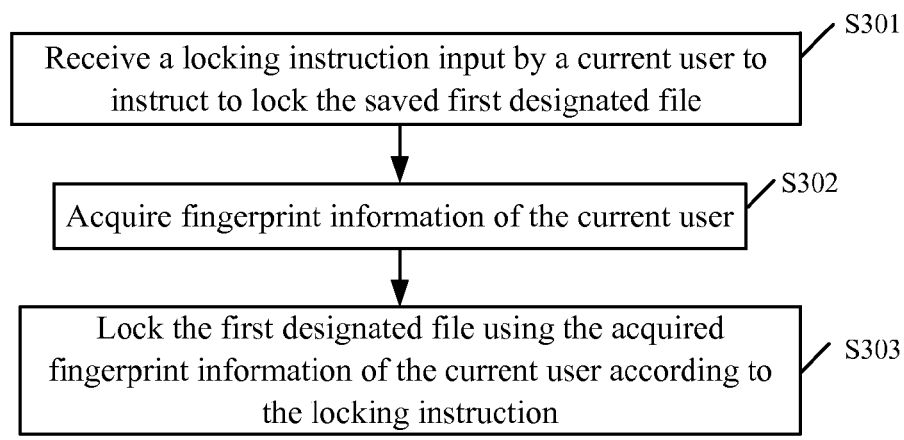
FIG. 3 is a flow chart showing a method for locking a file, according to another exemplary embodiment.

FIG. 3 is a flow chart showing an exemplary method for locking a first designated file that has already been saved on a mobile terminal consistent with embodiments of the disclosure. As shown in FIG. 3, at S301, a locking instruction input by a current user is received. The locking instruction instructs to lock the saved first designated file.

In some embodiments, the locking instruction may be a long-press instruction. The mobile terminal determines whether the locking instruction is received by checking a time period during which an area corresponding to the first designated file is touched. When the mobile terminal determines that the locking instruction is received, the first designated file corresponding to the locking instruction is locked.

Figure 3A:
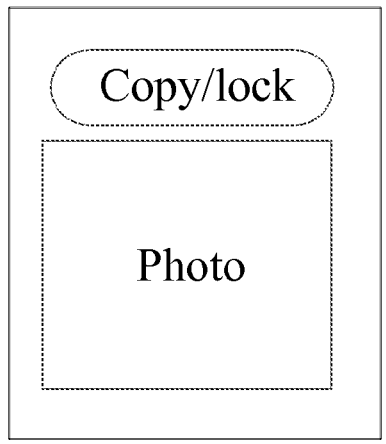
FIG. 3a is a diagram illustrating an interface containing a copying option and a locking option output by a mobile terminal.

For example, when the user is viewing an album, he may long-press a photo in the album. The mobile terminal determines that a long-press instruction is received and outputs function options such as copying, locking, or unlocking. For example, as shown in FIG. 3a, two function options, i.e., copying and locking, are output for the user to select. The user can select one of the function options by clicking on that option.

Referring to FIG. 3, at S302, fingerprint information of the current user is acquired. That is, the fingerprint information of the user who inputs the locking instruction is acquired.

At S303, the first designated file is locked using the acquired fingerprint information of the current user according to the locking instruction.

After the first designated file is locked, the first designated file is in a locked state. The locked state includes a hidden state, an unmodifiable state, an undeletable state, or an unviewable state.

After the file is locked, other operations of the user such as S203-S206 and/or S207-S210 shown in FIG. 2 can be performed on the locked file, detailed description of which is omitted here.

In the example shown in FIG. 2, locking a file using the fingerprint information is described. In some embodiments, a file may be locked using other biological feature recognition information such as voiceprint information, iris information, or face information.

Figure 4:
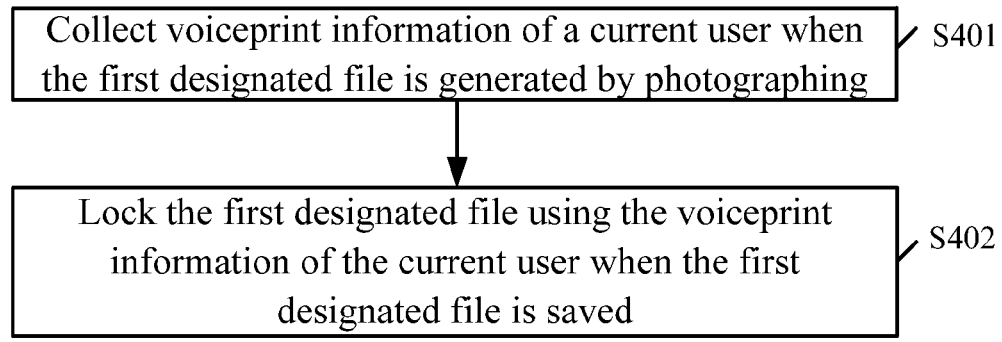
FIG. 4 is a flow chart showing a method for locking a file, according to another exemplary embodiment.

FIG. 4 is a flow chart showing an exemplary method for locking a file using voiceprint information consistent with embodiments of the disclosure. As shown in FIG. 4, at S401, voiceprint information of a current user is collected when the first designated file is generated by photographing.

Figure 4A:
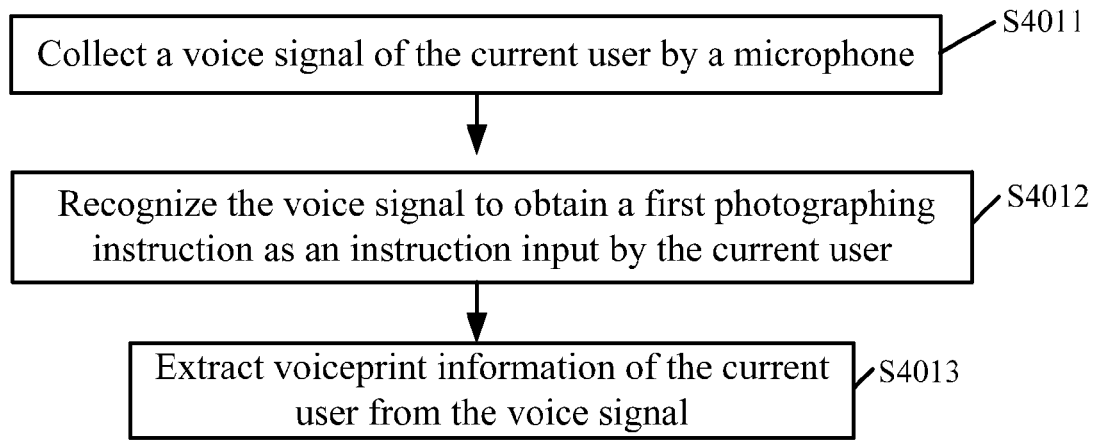
FIG. 4a is a detailed flow chart of S401 in FIG. 4.

FIG. 4a shows an exemplary method for collecting the voiceprint information of the current user. As shown in FIG. 4a, at S4011, a voice signal of the current user is collected by a microphone. At S4012, the voice signal is recognized to obtain a first photographing instruction as an instruction input by the current user. The first photographing instruction instructs to perform photographing to generate the first designated file. The first designated file may be in a photo or video format. At S4013, the voiceprint information of the current user is extracted from the voice signal, and is saved on a mobile terminal as the biological feature recognition information, for comparison when the file is browsed, viewed, or unlocked.

Figures 4B, 5:
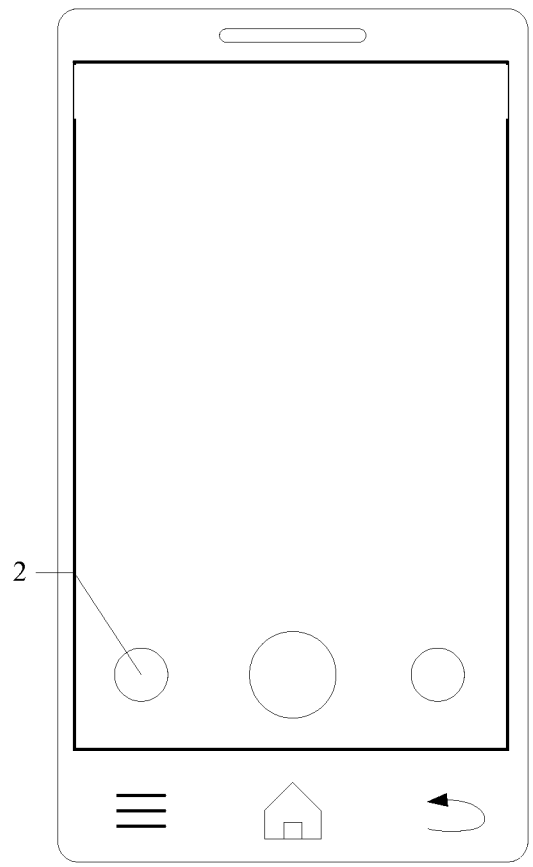
FIG. 4b is a diagram illustrating an interface when a mobile terminal outputs a voice control shutter option.
FIG. 5 is a flow chart showing a method for locking a file, according to another exemplary embodiment.

For example, when a camera module of the mobile terminal is started, the mobile terminal outputs a voice control shutter option 2 on a touchscreen, as shown in FIG. 4b. After the user clicks on the voice control shutter option 2 and speaks "start photographing," the mobile terminal receives the voice signal through the microphone, obtains the first photographing instruction by analysis and recognition, and then takes a photo or a video. Further, the mobile terminal extracts the voiceprint information of the current user from the voice signal.

Referring to FIG. 4, at S402, when the first designated file is saved, it is locked using the voiceprint information of the current user.

The method and process for viewing and unlocking the file locked using the voiceprint information is similar to those using the fingerprint information, as shown in S203-S206 and S207-S210 of FIG. 2, and thus are not described here.

FIG. 5 is a flow chart showing an exemplary method for locking a file using face or iris information consistent with embodiments of the disclosure. As shown in FIG. 5, at S501, face information or iris information of a current user is collected when the first designated file is generated by photographing.

Figure 5A:
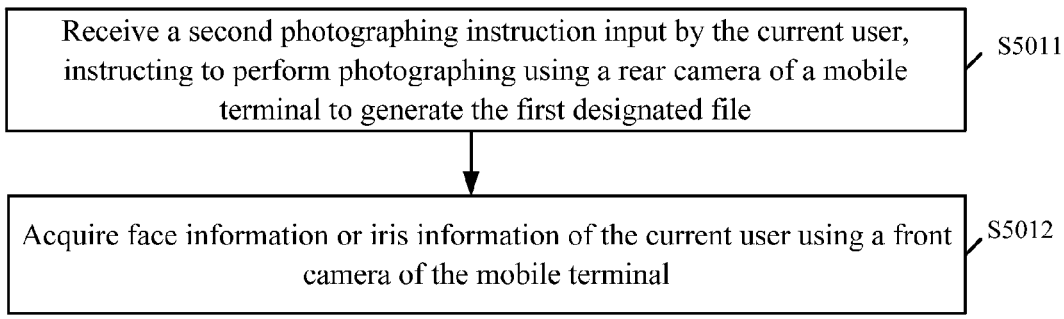
FIG. 5a is a detailed flow chart of S501 in FIG. 5.
Figure 5B:
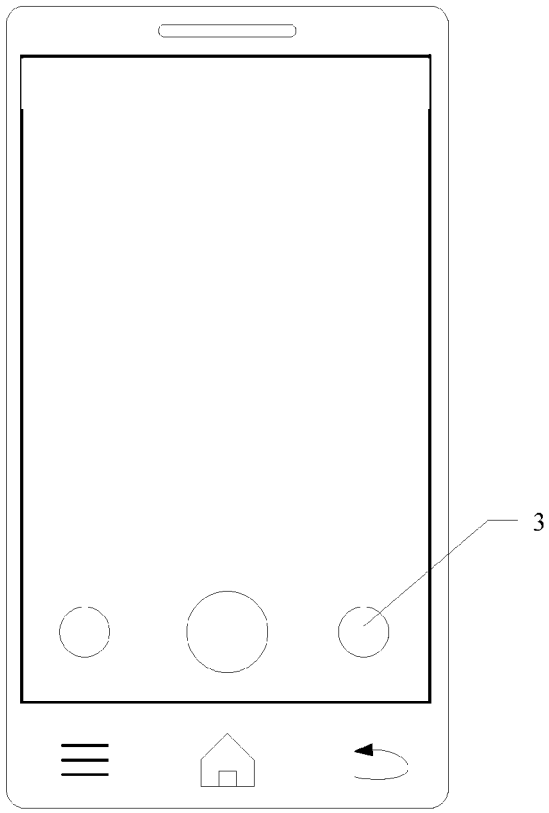
FIG. 5b is a diagram illustrating an interface when a mobile terminal outputs a third photographing shutter option.

FIG. 5a shows an exemplary method for collecting the face information or the iris information. As shown in FIG. 5a, at S5011, a second photographing instruction input by the current user is received. The second photographing instruction instructs to perform photographing using a rear camera of a mobile terminal to generate the first designated file. The first designated file is in a photo or video format. At S5012, face information or iris information of the current user is acquired using a front camera of the mobile terminal.

For example, when a camera module of the mobile terminal is started, the mobile terminal outputs a third photographing shutter option 3 on a touchscreen. When the user clicks on the third photographing shutter option 3, the mobile terminal receives the second photographing instruction input by the current user, thereby starts the rear camera to perform photographing to generate the first designated file. Further, the mobile terminal also starts the front camera to photograph and acquire the face information or the iris information of the current user.

Referring to FIG. 5, at S502, when the photographed first designated file is saved, the first designated file is locked using the iris information or the face information of the current user.

The method and process for viewing and unlocking the file locked using the face or iris information is similar to those using the fingerprint information, as shown in S203-S206 and S207-S210 of FIG. 2, and thus are not described here.

Figure 6:
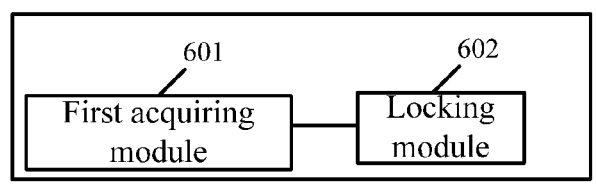
FIG. 6 is a block diagram illustrating a device for locking a file, according to an exemplary embodiment.

FIG. 6 is a block diagram illustrating an exemplary device for locking a file consistent with embodiments of the present disclosure. The device may be a mobile terminal such as a smart phone or a tablet PC. As shown in FIG. 6, the device includes a first acquiring module 601 and a locking module 602. The first acquiring module 601 is configured to acquire biological feature recognition information of a current user. The biological feature recognition information includes fingerprint information, voiceprint information, iris information, or face information. The locking module 602 is configured to lock a first designated file using the biological feature recognition information of the current user acquired by the first acquiring module 601. The first designated file may be, for example, a photo, a video, or a text file.

Figure 7:
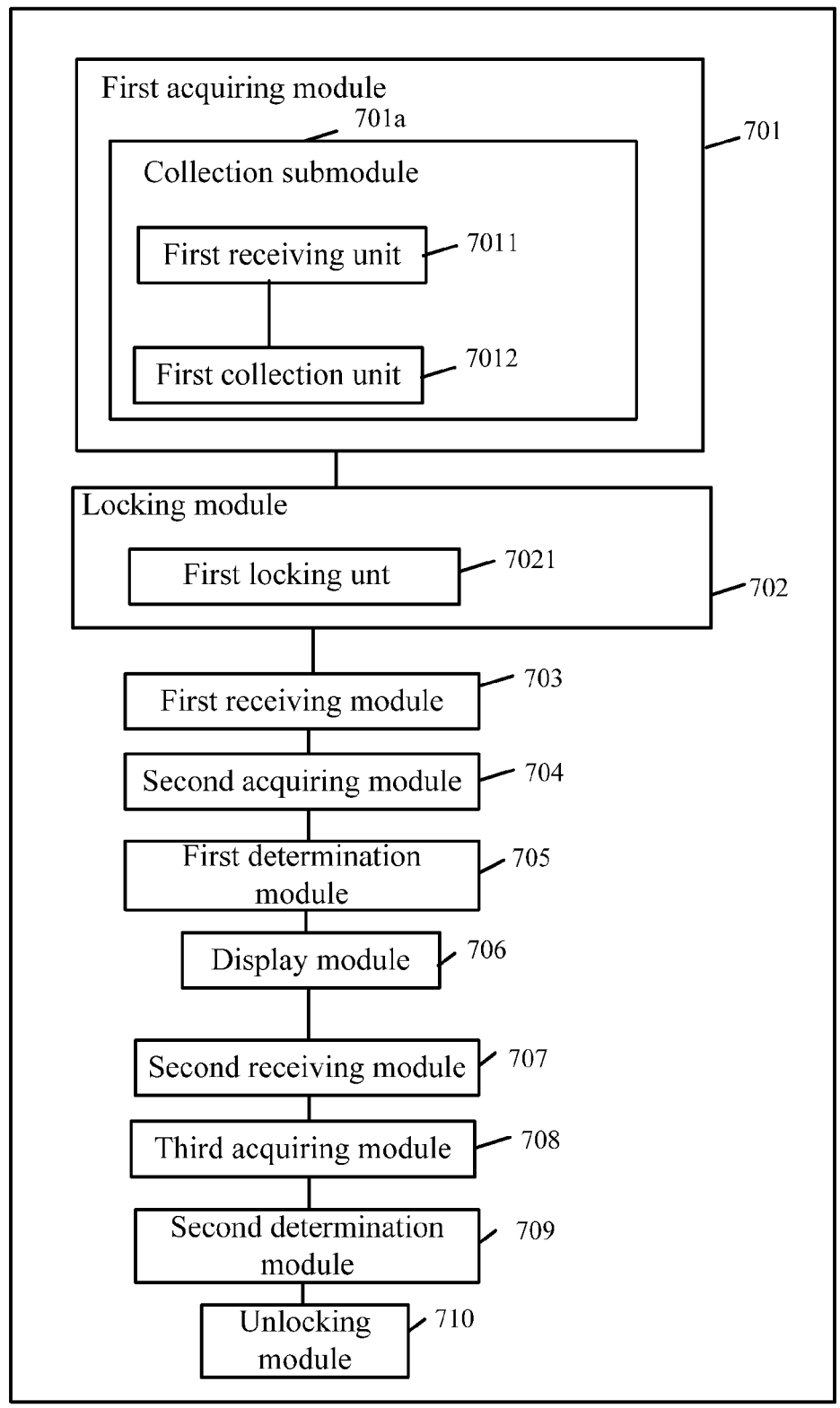
FIG. 7 is a block diagram illustrating a device for locking a file, according to another exemplary embodiment.

FIG. 7 is a block diagram illustrating another exemplary device for locking a file consistent with embodiments of the present disclosure. In the device shown in FIG. 7, the biological feature recognition information includes fingerprint information, and the first designated file includes a photo file. As shown in FIG. 7, the device includes a first acquiring module 701 and a locking module 702. The first acquiring module 701 is configured to acquire fingerprint information of a current user. The locking module 702 is configured to lock a first designated file using the fingerprint information of the current user acquired by the first acquiring module 701.

The first acquiring module 701 includes a collection submodule 701a configured to collect the fingerprint information of the current user when the first designated file is generated by photographing. In some embodiments, as shown in FIG. 7, the collection submodule 701a includes a first receiving unit 7011 and a first collection unit 7012. The first receiving unit 7011 is configured to receive a first photographing instruction input by the current user through a touchscreen. The first photographing instruction instructs to perform photographing to generate the first designated file. The first designated file may be in a photo or video format. The first collection unit 7012 is configured to collect fingerprint information when the current user inputs the first photographing instruction through the touchscreen.

Further, the locking module 702 includes a first locking unit 7021. The first locking unit 7021 is configured to lock the first designated file using the fingerprint information of the current user when the first designated file is saved. After the first designated file is locked, the first designated file is in a locked state, which includes a hidden state, an unmodifiable state, an undeletable state, or an unviewable state.

As shown in FIG. 7, the device further includes a first receiving module 703, a second acquiring module 704, a first determination module 705, and a display module 706.

The first receiving module 703 is configured to receive a file-checking instruction input by the user. The file-checking instruction instructs to check a second designated file or a designated folder containing the second designated file. The second designated file is a file in a locked state.

The second acquiring module 704 is configured to acquire fingerprint information of the user who inputs the file-checking instruction.

The first determination module 705 is configured to determine whether the fingerprint information acquired by the second acquiring module 704 is the same as the fingerprint information used when the second designated file is locked.

The display module 706 is configured to display the second designated file if the fingerprint information acquired by the second acquiring module 704 is the same as the fingerprint information used to lock the second designated file. The display module 706 does not display the second designated file if the fingerprint information acquired by the second acquiring module 704 is different from the fingerprint information used to lock the second designated file.

In some embodiments, the device shown in FIG. 7 also provides a function option switch, such as the switch shown in FIGS. 2c and 2d, by which on/off of the function of locking files using the biological feature recognition information can be set by the user.

Referring to FIG. 7, the device further includes a second receiving module 707, a third acquiring module 708, a second determination module 709, and an unlocking module 710.

The second receiving module 707 is configured to receive a file-unlocking instruction input by the user. The file-unlocking instruction instructs to unlock the second designated file or the designated folder containing the second designated file.

The third acquiring module 708 is configured to acquire fingerprint information of the user who inputs the file-unlocking instruction.

The second determination module 709 is configured to determine whether the fingerprint information of the user acquired by the third acquiring module 708 is the same as the fingerprint information used to lock the second designated file being.

The unlocking module 710 is configured to unlock the second designated file if the fingerprint information of the user acquired by the third acquiring module 708 is the same as the fingerprint information used to lock the second designated file. The unlocking module 710 does not unlock the second designated file if the fingerprint information of the user who inputs the file-unlocking instruction is different from the fingerprint information used to lock the second designated file. The unlocking module 710 may also output prompt information, for example, to indicate that the fingerprint information does not match.

Figure 8:
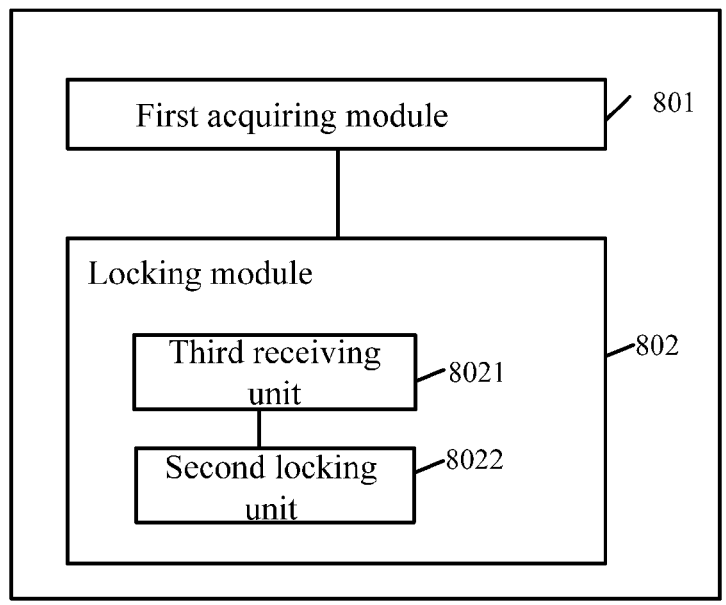
FIG. 8 is a block diagram illustrating a device for locking a file, according to another exemplary embodiment.

FIG. 8 is a block diagram illustrating an exemplary device for locking a first designated file that has already been saved on a mobile terminal consistent with embodiments of the disclosure. As shown in FIG. 8, the device includes a first acquiring module 801 and a locking module 802. The first acquiring module 801 is configured to acquire biological feature recognition information of a current user. The biological feature recognition information includes fingerprint information, voiceprint information, iris information, or face information. The locking module 802 is configured to lock the first designated file using the biological feature recognition information of the current user acquired by the first acquiring module 801.

As shown in FIG. 8, the locking module 802 includes a third receiving unit 8021 and a second locking unit 8022. The third receiving unit 8021 is configured to receive a locking instruction input by the current user. The locking instruction instructs to lock the saved first designated file.

The second locking unit 8022 is configured to lock the first designated file using the biological feature recognition information of the current user according to the locking instruction.

Figure 9:
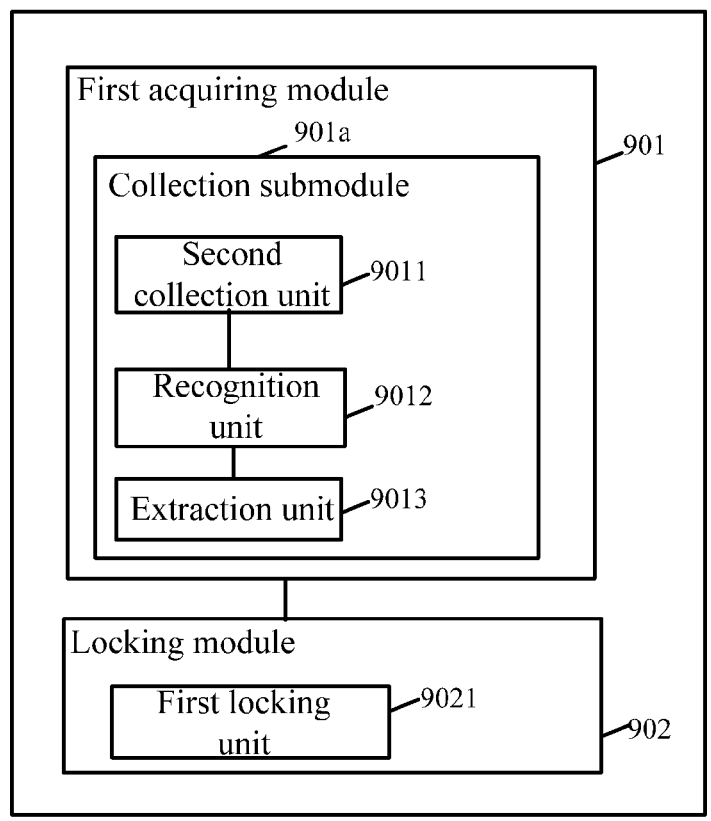
FIG. 9 is a block diagram illustrating a device for locking a file, according to another exemplary embodiment.

FIG. 9 is a block diagram illustrating an exemplary device for locking a file using voiceprint information consistent with embodiments of the present disclosure. As shown in FIG. 9, the device includes a first acquiring module 901 and a locking module 902. The first acquiring module 901 is configured to acquire voiceprint information of a current user. The locking module 902 is configured to lock the first designated file using the voiceprint information of the current user acquired by the first acquiring module 901.

The first acquiring module includes a collection submodule 901a configured to collect the voiceprint information of the current user when the first designated file is generated by photographing. The collection submodule 901a includes a second collection unit 9011, a recognition unit 9012, and an extraction unit 9013.

The second collection unit 9011 is configured to collect a voice signal of the current user by a microphone. The recognition unit 9012 is configured to recognize the voice signal to obtain a first photographing instruction as an instruction input by the current user. The first photographing instruction instructs to perform photographing to generate the first designated file. The extraction unit 9013 is configured to extract the voiceprint information of the current user from the voice signal.

When a photo or a video is saved after the photo is taken or the video is recorded, the photo or the video is locked using the voiceprint information of the current user. In some embodiments, the device shown in FIG. 9 may also include other functional modules for browsing, viewing, and unlocking files locked using the voiceprint information. Such functional modules are similar to those of the device shown in FIG. 7, except that in FIG. 7 the fingerprint information is used, and thus details of which are omitted here.

Figure 10:
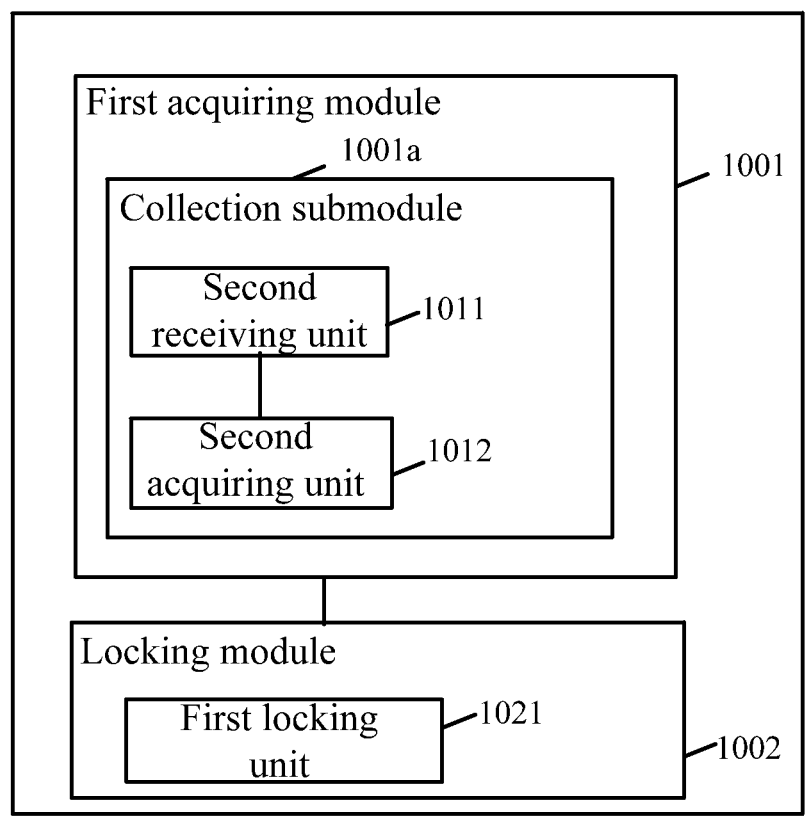
FIG. 10 is a block diagram illustrating a device for locking a file, according to another exemplary embodiment.

FIG. 10 is a block diagram illustrating an exemplary device for locking a file using face or iris information consistent with embodiments of the present disclosure. As shown in FIG. 10, the device includes a first acquiring module 1001 and a locking module 1002. The first acquiring module 1001 is configured to acquire iris information or face information of a current user. The locking module 1002 is configured to lock the first designated file using the iris information or the face information of the current user acquired by the first acquiring module 1001.

The first acquiring module 1001 includes a collection submodule 1001a configured to collect the face information or the iris information of the current user when the first designated file is generated by photographing. The collection submodule 1001a includes a second receiving unit 1011 and a second acquiring unit 1012.

The second receiving unit 1011 is configured to receive a second photographing instruction input by the current user. The second photographing instruction instructs to perform photographing to generate the first designated file by a rear camera of a mobile terminal. The first designated file may be a photo or a video. The second acquiring unit 1012 is configured to acquire the face information or the iris information of the current user by a front camera of the mobile terminal.

When a photo or a video is saved after the photo is taken or the video is recorded, the photo or the video is locked using the face information or the iris information of the current user. In some embodiments, the device shown in FIG. 9 may also include other functional modules for browsing, viewing, and unlocking files locked using the iris information or the face information. Such functional modules are similar to those of the device shown in FIG. 7, except that in FIG. 7 the fingerprint information is used, and thus details of which are omitted here.

Figure 11:
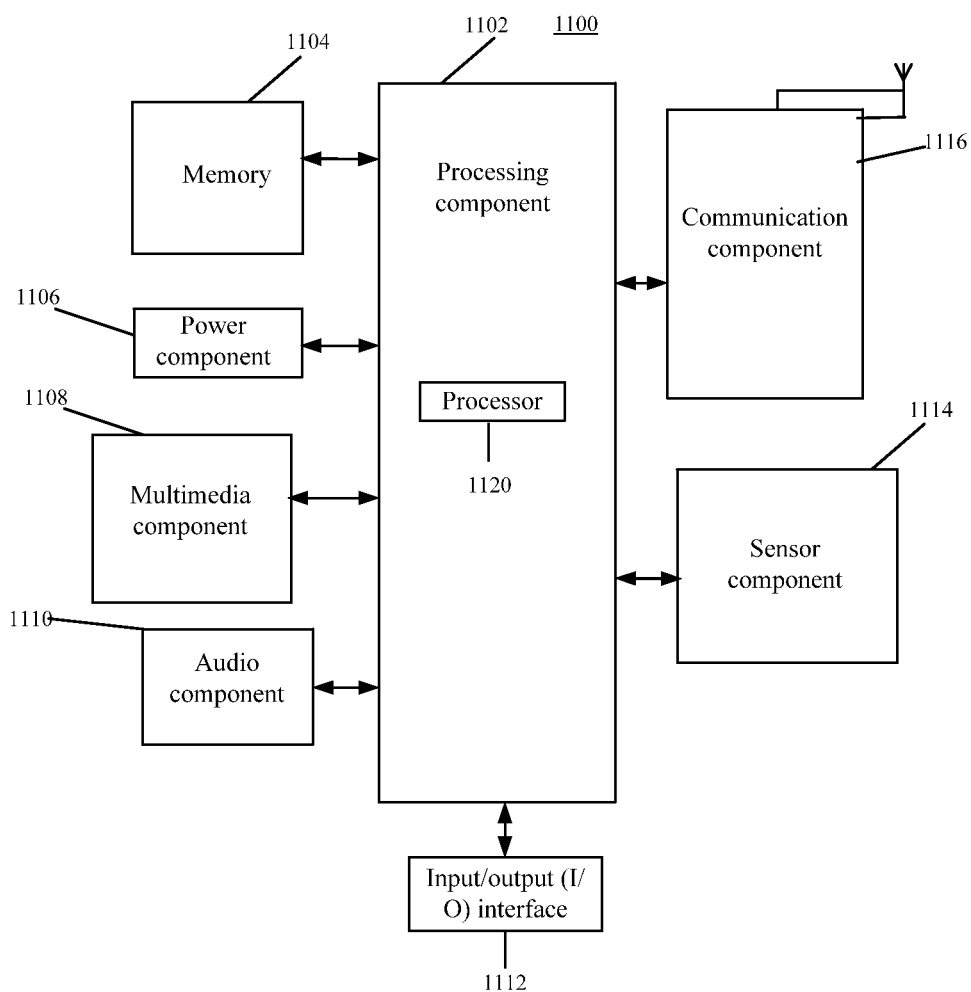
FIG. 11 is a block diagram illustrating a device for locking a file, according to another exemplary embodiment.

FIG. 11 is a block diagram illustrating an exemplary device 1100 for locking a file consistent with embodiments of the present disclosure. For example, the device 1100 may be a mobile phone, a computer, a digital broadcast terminal, a messaging device, a gaming console, a tablet device, a medical device, exercise equipment, a personal digital assistant, or the like.

As shown in FIG. 11, the device 1100 includes one or more of a processing component 1102, a storage 1104, a power component 1106, a multimedia component 1108, an audio component 1110, an input/output (I/O) interface 1112, a sensor component 1114, and a communication component 1116.

The processing component 1102 usually controls the overall operations of the device 1100, such as the operations associated with display, telephone calls, data communications, camera operations, and recording operations. The processing component 1102 may include one or more processors 1120 to execute instructions to perform all or a part of the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The storage 1104 is configured to store various types of data to support the operations of the device 1100. Examples of such data include instructions for any application or method operated on the device 1100, contact data, phonebook data, messages, pictures, videos, etc. The storage 1104 may be implemented by using any type of volatile or non-volatile memory devices or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1106 provides power to the respective components of the device 1100. The power component 1106 may include a power management system, one or more power sources, and components associated with the generation, management, and distribution of power for the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touchscreen to receive input signals from the user. The touch panel includes one or more touch sensors to sense touches, swipes, and gestures on the touch panel. The touch sensors may not only sense a boundary of a touch or swipe action, but also sense a duration of time and a pressure associated with the touch or swipe action. In some embodiments, the multimedia component 1108 includes a front camera and/or a rear camera. The front camera and/or the rear camera may receive external multimedia data while the device 1100 is in an operation mode such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive external audio signals when the device 1100 is in an operation mode such as a call mode, a recording mode and a voice recognition mode. The received audio signal may be further stored in the storage 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, a button, and the like. The button may include, but not limited to, a home page button, a volume button, a starting button, and a locking button.

The sensor component 1114 includes one or more sensors to provide status assessments of respective aspects of the device 1100. For example, the sensor component 1114 may detect an open/closed status of the device 1100, relative positioning of components, for example, the display and the keyboard of the device 1100, a position change of the device 1100 or of a component of the device 1100, a presence or absence of a user contacting with the device 1100, an orientation or an acceleration/deceleration of the device 1100, and a temperature change of the device 1100. The sensor component 1114 may include a proximity sensor configured to detect the presence of nearby objects without any physical contact. The sensor component 1114 may also include a light sensor such as a CMOS or CCD image sensor for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, by wire or wirelessly, between the device 1100 and other devices. The device 1100 may access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there also provides a non-transitory computer-readable storage medium storing instructions, such as the storage 1104 storing instructions executable by the one or more processors 1120 in the device 1100, for performing the above-described methods. For example, the non-transitory computer-readable storage medium may be a ROM, a RAM, a CD-ROM, a magnetic tape, a floppy disc, an optical data storage device, or the like.

In exemplary embodiments, there is also provided a device including a processor and a non-transitory computer-readable storage medium as described above.

Figure 12:
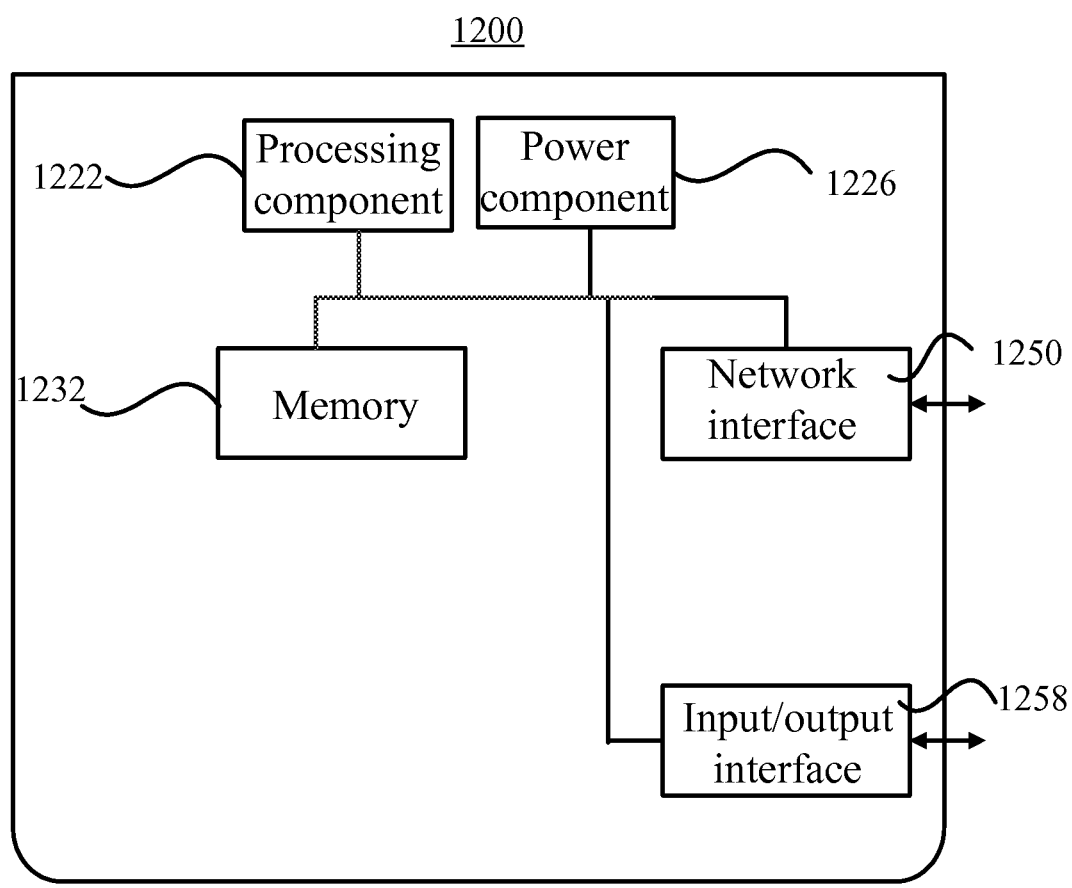
FIG. 12 is a block diagram illustrating a device for locking a file, according to another exemplary embodiment.

FIG. 12 is a block diagram illustrating an exemplary device 1200 for locking a file consistent with embodiments of the present disclosure. For example, the device 1200 may be provided as a server. As shown in FIG. 12, the device 1200 includes a processing component 1222 that includes one or more processors, and memory resources represented by a memory 1232 for storing instructions executable by the processing component 1222, such as application programs. Further, the processing component 1222 is configured to execute the instructions, to perform the methods consistent with embodiments of the present disclosure.

The device 1200 further includes a power component 1226 configured to perform power management of the device 1200, a wired or wireless network interface 1250 configured to connect the device 1200 to a network, and an input/output (I/O) interface 1258. The device 1200 may operate based on an operating system stored in the memory 1232, such as Windows Server™, Mac OS X™, Unix™, Linux™, FreeBSD™, or the like.

Consistent with embodiments of the present disclosure, such as those described above, the designated file is locked using biological feature recognition information of a current user, such that users other than the current user cannot perform operations, such as viewing or modifying, on the locked designated file. As such, the privacy of the current user can be effectively protected, and user experience is improved. Moreover, the user may choose which files are to be locked, which increases flexibility.

After considering this description and carrying out the embodiments disclosed herein, those skilled in the art may anticipate other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method for locking a file, the method being implemented in a device including at least one processor and a memory storing instructions executable by the at least one processor, and the method comprising:
   acquiring biological feature recognition information of a user, the biological feature recognition information including at least one of fingerprint information, voiceprint information, iris information, or face information; and
   locking a designated file using the biological feature recognition information, according to a locking instruction input being determined by a long-press instruction, wherein:
   acquiring the biological feature recognition information includes collecting the biological feature recognition information of the user when the designated file is generated by photographing and,
   when the biological feature recognition information is the fingerprint information, collecting the biological feature recognition information includes:
   receiving a photographing instruction input by the user through a touchscreen, the photographing instruction instructing to perform photographing to generate the designated file; and at the same time collecting the fingerprint information of the user when the photographing is performed:
the designated file is locked into a locked state, the locked state including one of a hidden state, an unmodifiable state, an undeletable state, or an unviewable state; and
the locked state is unlocked by the acquired biological feature recognition information of the user.

2. The method according to claim 1, wherein:
when the biological feature recognition information is the voiceprint information, collecting the biological feature recognition information includes:
collecting a voice signal of the user by a microphone;
recognizing the voice signal to obtain a photographing instruction that instructs to perform photographing to generate the designated file; and
extracting the voiceprint information of the user from the voice signal.

3. The method according to claim 1, wherein:
when the biological feature recognition information is the face information or the iris information, collecting the biological feature recognition information includes:
receiving the photographing instruction input by the user, the photographing instruction instructs to perform photographing by a rear camera of a mobile terminal to generate the designated file; and
acquiring the face information or the iris information of the user by a front camera of the mobile terminal.

4. The method according to claim 1, wherein locking the designated file using the biological feature recognition information includes locking the designated file using the biological feature recognition information when the designated file is saved after photographing.

5. The method according to claim 1, wherein:
the designated file is a file saved on a mobile terminal, and
locking the designated file using the biological feature recognition information includes:
receiving the locking instruction input by the user, the locking instruction instructing to lock the designated file; and
locking the designated file using the biological feature recognition information according to the locking instruction.

6. The method according to claim 1,
wherein:
the biological feature recognition information is first biological feature recognition information,
the method further comprising:
receiving a file-checking instruction input by a current user, the file-checking instruction instructing to view the designated file or a folder containing the designated file;
acquiring second biological feature recognition information associated with the current user;
determining whether the second biological feature recognition information is the same as the first biological feature recognition information; and
displaying the designated file if the second biological feature recognition information is the same as the first biological feature recognition information.

7. The method according to claim 1,
wherein:
the biological feature recognition information is first biological feature recognition information,
the method further comprising:

receiving a file-unlocking instruction input by a current user, the file-unlocking instruction instructing to unlock the designated file or a folder containing the designated file;
acquiring second biological feature recognition information associated with the current user;
determining whether the second biological feature recognition information is the same as the first biological feature recognition information; and
unlocking the designated file if the second biological feature recognition information is the same as the first biological feature recognition information.

8. A device for locking a file, comprising:
a processor;
a non-transitory computer-readable storage medium storing instructions that, when executed by the processor, cause the processor to:
acquire biological feature recognition information of a user, the biological feature recognition information including at least one of fingerprint information, voiceprint information, iris information, or face information; and
lock a designated file using the biological feature recognition information, according to a locking instruction input being determined by a long-press instruction, wherein:
the instructions further cause the processor to collect the biological feature recognition information of the user when the designated file is generated by photographing and,
when the biological feature recognition information is the fingerprint information, the instructions further cause the processor to:
receive a photographing instruction input by the user through a touchscreen, the photographing instruction instructing to perform photographing to generate the designated file; and
at the same time collect the fingerprint information of the user when the photographing is performed:
the designated file is locked into a locked state, the locked state including one of a hidden state, an unmodifiable state, an undeletable state, or an unviewable state; and
the locked state is unlocked by the acquired biological feature recognition information of the user.

9. The device according to claim 8, wherein:
when the biological feature recognition information is the voiceprint information, the instructions further cause the processor to:
collect a voice signal of the user by a microphone;
recognize the voice signal to obtain a photographing instruction that instructs to perform photographing to generate the designated file; and
extract the voiceprint information of the user from the voice signal.

10. The device according to claim 8, wherein:
when the biological feature recognition information is the face information or the iris information, the instructions further cause the processor to:
receive the photographing instruction input by the user, the photographing instruction instructing to perform photographing by a rear camera of a mobile terminal to generate the designated file; and
acquire the face information or the iris information of the user by a front camera of the mobile terminal.

11. The device according to claim 8, the instructions further causing the processor to:
   lock the designated file using the biological feature recognition information when the designated file is saved after photographing.

12. The device according to claim 8, wherein:
   the designated file is a file saved on a mobile terminal,
   the instructions further causing the processor to:
      receive the locking instruction input by the user, the locking instruction instructing to lock the designated file; and
      lock the designated file using the biological feature recognition information according to the locking instruction.

13. The device according to claim 8, wherein:
   the biological feature recognition information is first biological feature recognition information, and
   the instructions further cause the processor to:
      receive a file-checking instruction input by a current user, the file-checking instruction instructing to view the designated file or a folder containing the designated file;
      acquire second biological feature recognition information associated with the current user;
      determine whether the second biological feature recognition information is the same as the first biological feature recognition information; and
      display the designated file if the second biological feature recognition information is the same as the first biological feature recognition information.

14. The device according to claim 8, wherein:
   the biological feature recognition information is first biological feature recognition information, and
   the instructions further cause the processor to:
      receive a file-unlocking instruction input by a current user, the file-unlocking instruction instructing to unlock the designated file or a folder containing the designated file;
      acquire second biological feature recognition information associated with the current user;
      determine whether the second biological feature recognition information is the same as the first biological feature recognition information; and
      unlock the designated file if the second biological feature recognition information is the same as the first biological feature recognition information.

15. A non-transitory computer-readable storage medium storing instructions that, when executed by one or more processors of a device, cause the device to:
   acquire biological feature recognition information of a user, the biological feature recognition information including at least one of fingerprint information, voiceprint information, iris information, or face information; and
   lock a designated file using the biological feature recognition information, according to a locking instruction input being determined by a long-press instruction,
   wherein:
      the instructions further cause the device to collect the biological feature recognition information of the user when the designated file is generated by photographing and,
      when the biological feature recognition information is the fingerprint information, the instructions further cause the device to:
         receive a photographing instruction input by the user through a touchscreen, the photographing instruction instructing to perform photographing to generate the designated file; and
         at the same time collect the fingerprint information of the user when the photographing is performed:
      the designated file is locked into a locked state, the locked state including one of a hidden state, an unmodifiable state, an undeletable state, or an unviewable state; and
      the locked state is unlocked by the acquired biological feature recognition information of the user.

* * * * *